(12) United States Patent
Fu et al.

(10) Patent No.: US 10,911,176 B2
(45) Date of Patent: Feb. 2, 2021

(54) METHOD AND APPARATUS FOR REPORTING CHANNEL STATE INFORMATION

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Di Su, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/347,423

(22) PCT Filed: Nov. 2, 2017

(86) PCT No.: PCT/KR2017/012311
§ 371 (c)(1),
(2) Date: May 3, 2019

(87) PCT Pub. No.: WO2018/084588
PCT Pub. Date: May 11, 2018

(65) Prior Publication Data
US 2019/0268089 A1 Aug. 29, 2019

(30) Foreign Application Priority Data

Nov. 4, 2016 (CN) .......................... 2016 1 0965183
Jul. 3, 2017 (CN) .......................... 2017 1 0531521

(51) Int. Cl.
*H04L 5/00* (2006.01)
*H04L 1/00* (2006.01)
(Continued)

(52) U.S. Cl.
CPC .......... *H04L 1/0026* (2013.01); *H04L 1/0027* (2013.01); *H04L 5/0044* (2013.01);
(Continued)

(58) Field of Classification Search
CPC ... H04L 1/0026; H04L 1/0027; H04L 5/0044; H04L 5/0051; H04L 5/0057; H04L 25/0224; H04L 27/2602; H04W 72/0446
See application file for complete search history.

(56) References Cited

U.S. PATENT DOCUMENTS

2011/0244877 A1* 10/2011 Farajidana ............ H04L 5/0073
455/452.2
2013/0279437 A1* 10/2013 Ng ...................... H04L 27/2655
370/329
(Continued)

OTHER PUBLICATIONS

CATT, 'On remaining issues for hybrid CSI', R1-1608728, TSG-RAN WG1 Meeting #86bis, Oct. 1, 2016, Lisbon, Portugal.
(Continued)

*Primary Examiner* — Gary Mui
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure discloses a method for reporting channel state information CSI, including: determining, by a user equipment (UE), a number of resources occupied by a demodulation reference signal (DMRS) used when calculating CSI; determining, by the UE, a number of resources used to transmit a physical downlink shared channel (PDSCH) used when calculating the CSI according to the number of resources occupied by the DMRS; and calculating, by the UE, the CSI according to the number of resources used to transmit the PDSCH determined, and reporting the
(Continued)

CSI. Using the present disclosure can guarantee the performance of transmitting PDSCHs in a NR system.

18 Claims, 7 Drawing Sheets

(51) Int. Cl.
    *H04L 27/26*     (2006.01)
    *H04W 72/04*     (2009.01)
    *H04W 80/08*     (2009.01)

(52) U.S. Cl.
    CPC .......... *H04L 5/0051* (2013.01); *H04L 5/0057* (2013.01); *H04L 27/2607* (2013.01); *H04W 72/042* (2013.01); *H04W 72/0446* (2013.01); *H04W 80/08* (2013.01); *H04L 5/0007* (2013.01)

(56) References Cited

U.S. PATENT DOCUMENTS

| | | |
|---|---|---|
| 2015/0016386 A1 | 1/2015 | Tamrakar et al. |
| 2015/0071238 A1* | 3/2015 | Seo ............... H04B 7/0413 370/329 |
| 2015/0092722 A1 | 4/2015 | Zhang et al. |
| 2015/0098347 A1* | 4/2015 | Guo ............... H04L 5/0053 370/252 |
| 2015/0263796 A1 | 9/2015 | Nam et al. |
| 2016/0065290 A1* | 3/2016 | Zhu ............... H04B 7/0417 370/329 |
| 2016/0173256 A1* | 6/2016 | Seo ............... H04W 72/0413 370/329 |
| 2017/0126381 A1* | 5/2017 | Park ............... H04L 5/0048 |
| 2017/0195017 A1* | 7/2017 | Kim ............... H04W 72/0413 |
| 2017/0366998 A1* | 12/2017 | Lee ............... H04L 5/00 |
| 2018/0124752 A1* | 5/2018 | Takeda ............... H04W 72/042 |
| 2019/0028913 A1* | 1/2019 | Park ............... H04L 5/0048 |
| 2019/0081876 A1* | 3/2019 | Ghare ............... H04L 63/1408 |

OTHER PUBLICATIONS

Samsung, 'Advanced CSI feedback for NR', R1-1609089, 3GPP TSG RAN WG1 #86b, Sep. 29, 2016, Lisbon, Portugal.

* cited by examiner

[Fig. 1]
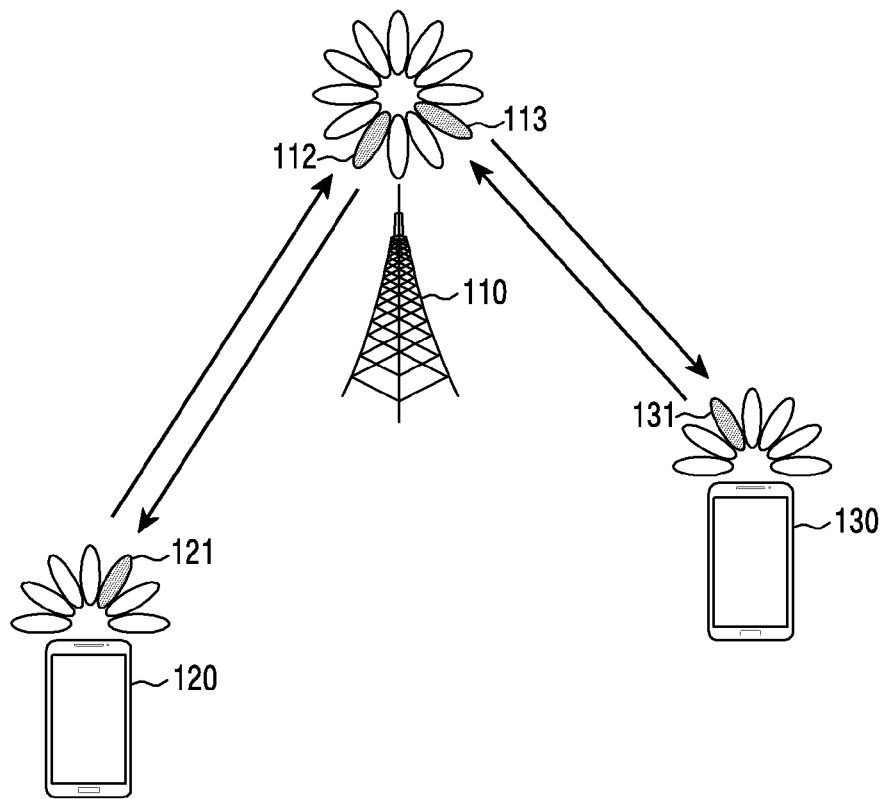
[Fig. 2]
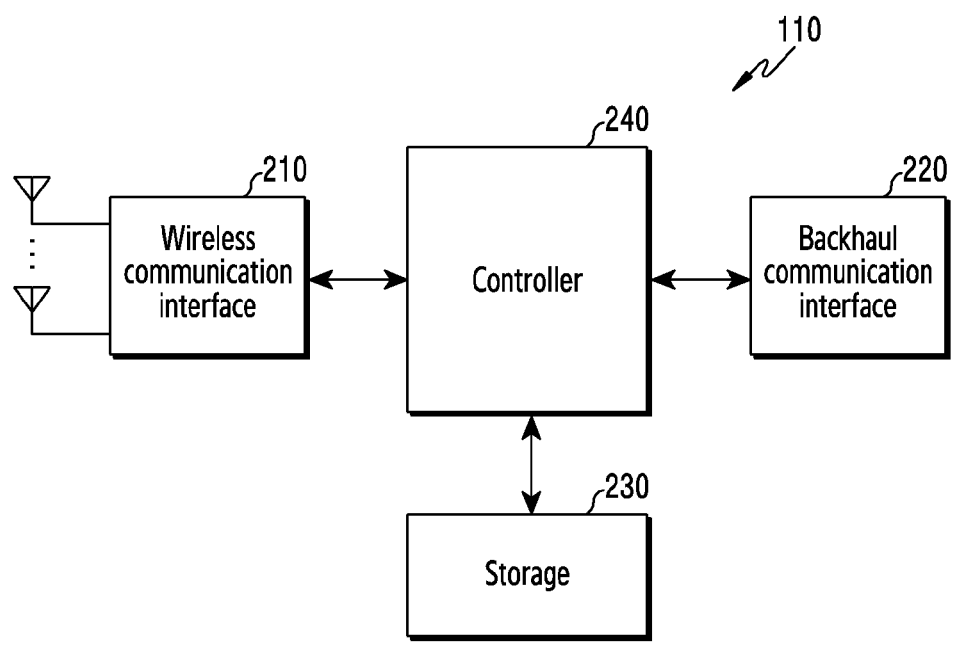

[Fig. 3]
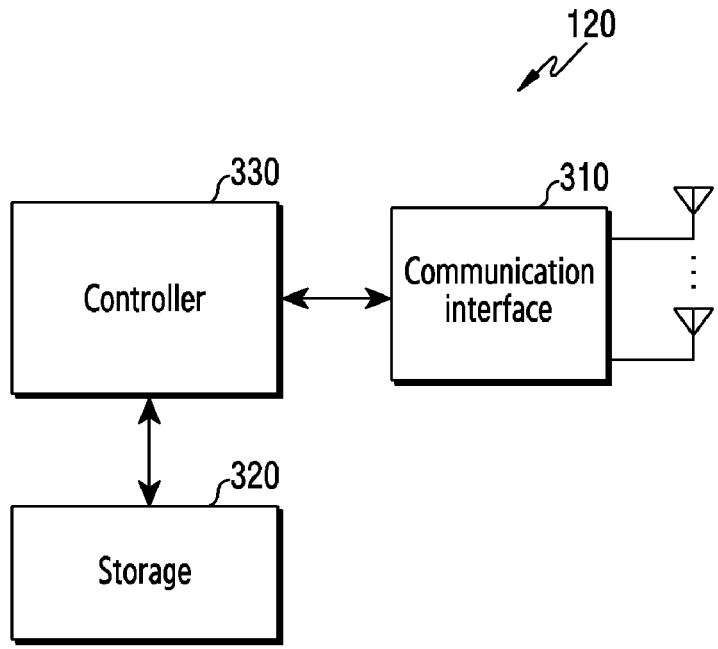
[Fig. 4]
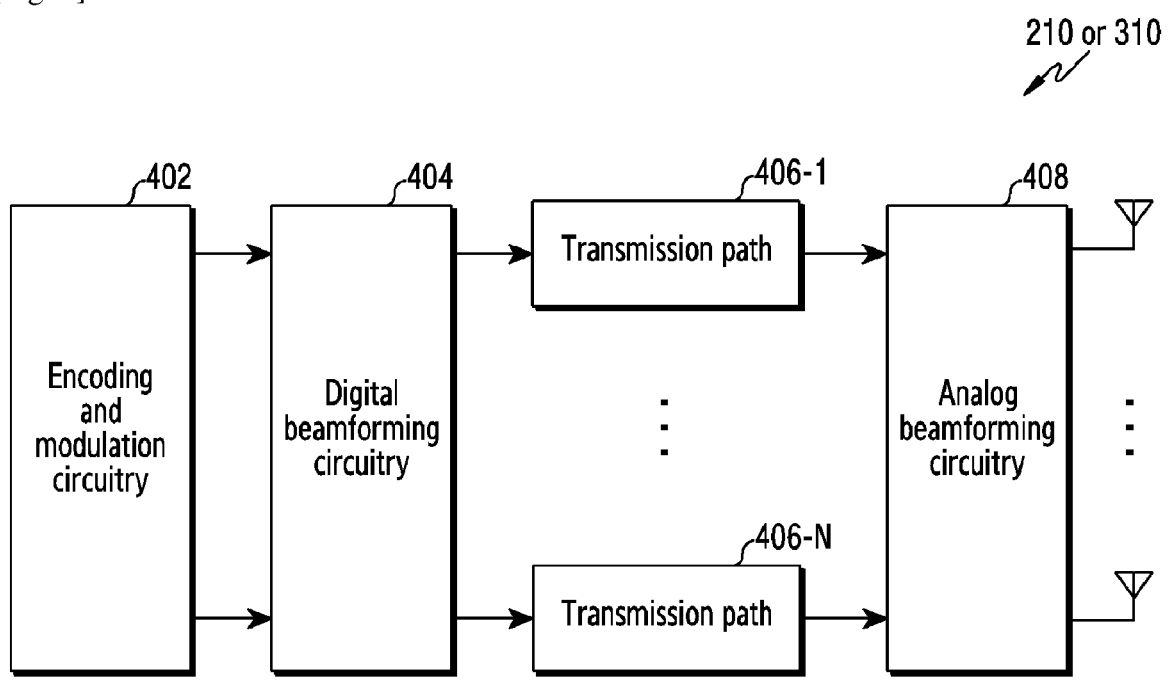

[Fig. 5]
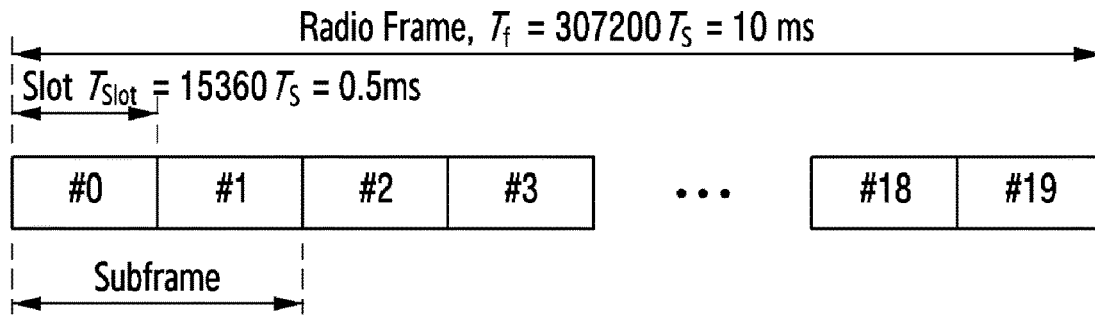
[Fig. 6]
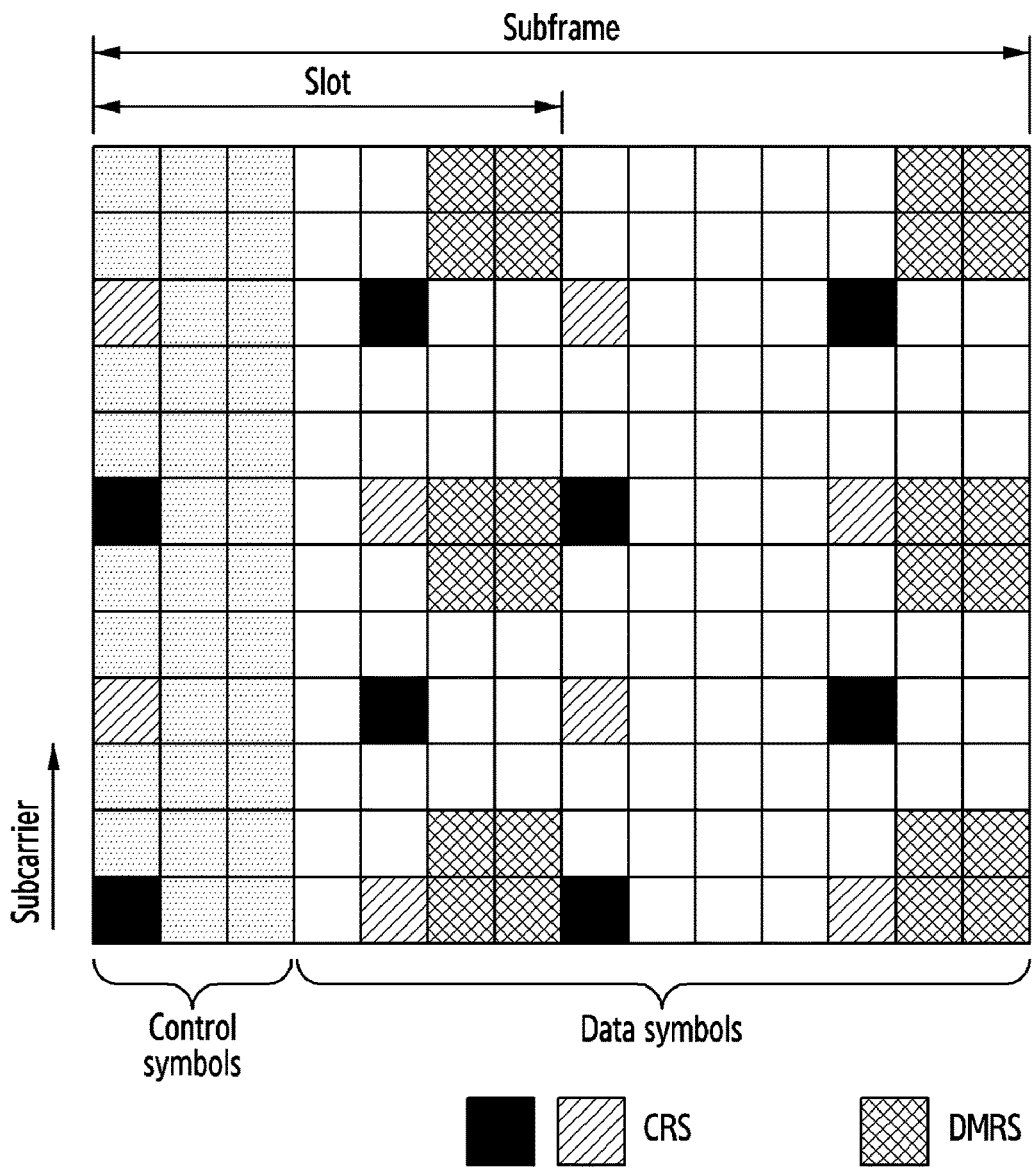

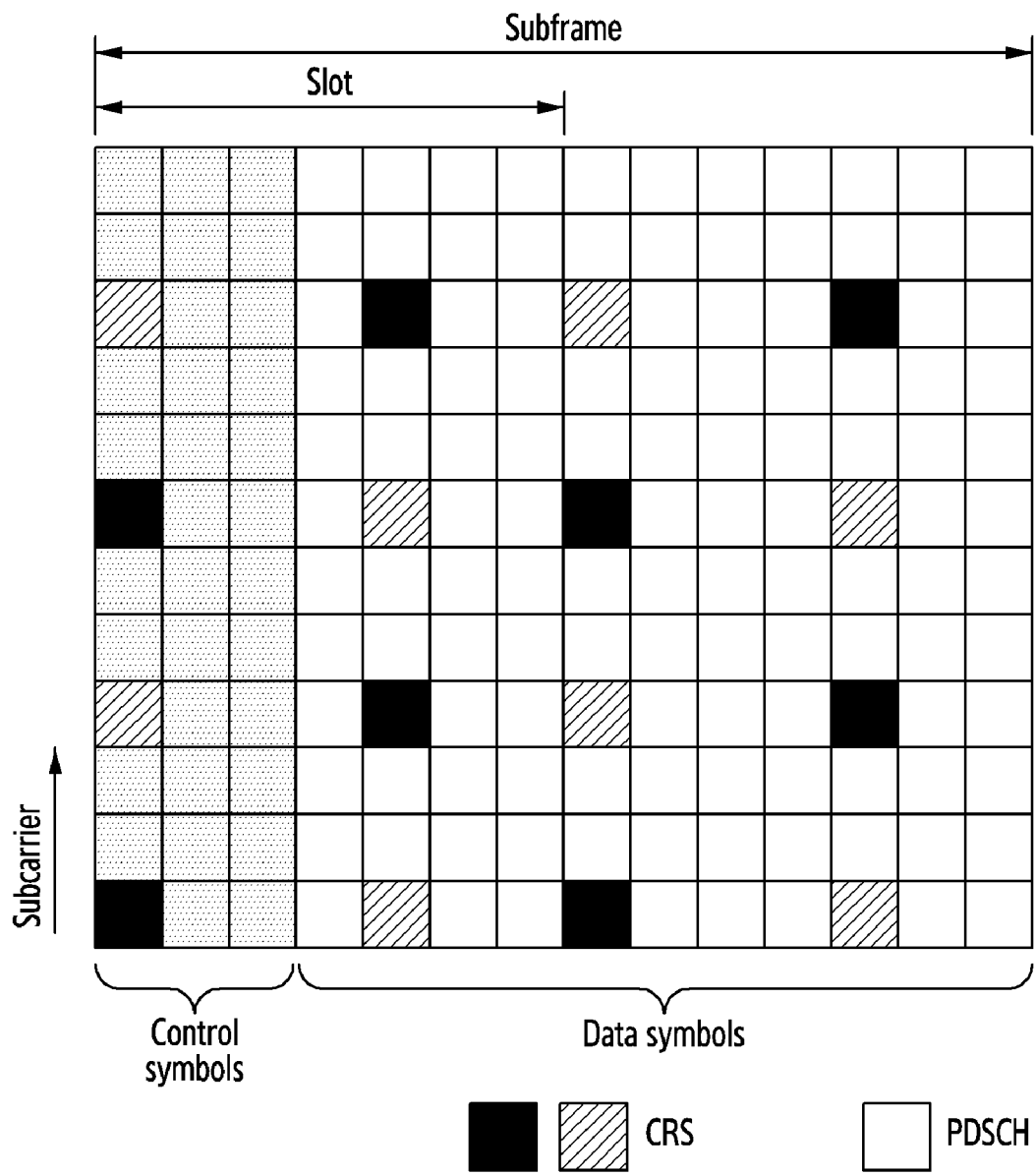
[Fig. 7]

[Fig. 8]
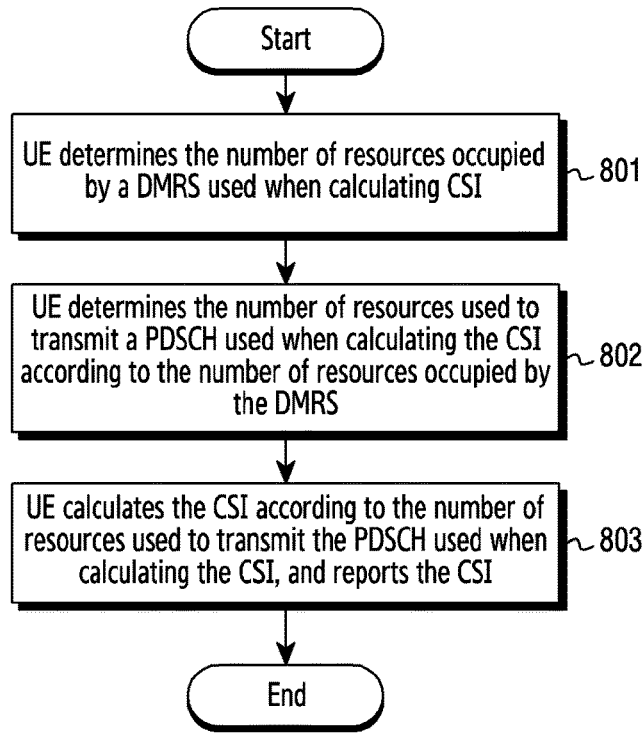
[Fig. 9]
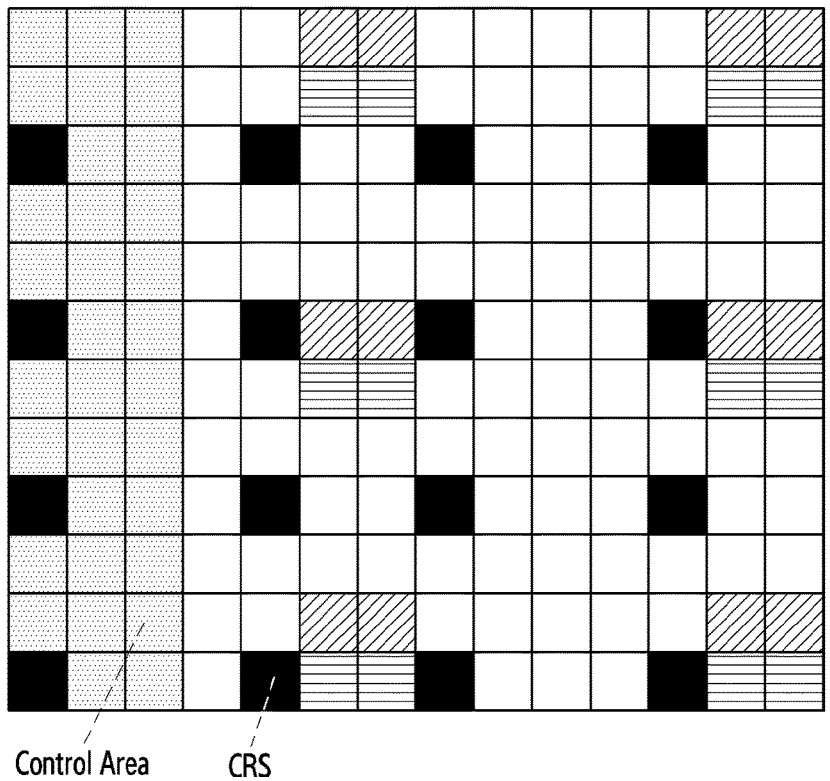
Control Area    CRS
 DMRS antenna ports 7 and 8       DMRS antenna ports 9 and 10

[Fig. 10]
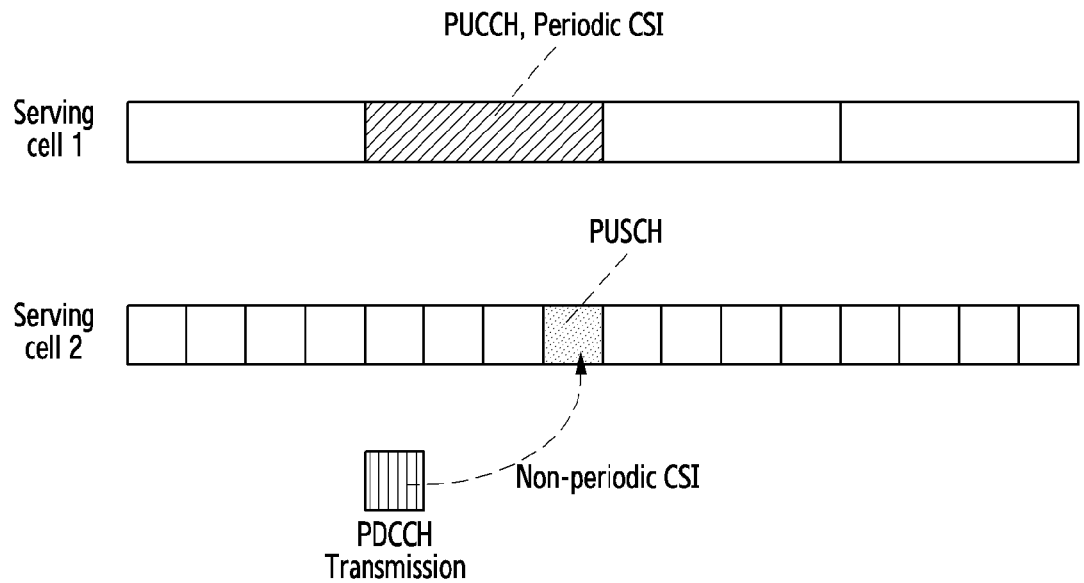
[Fig. 11]
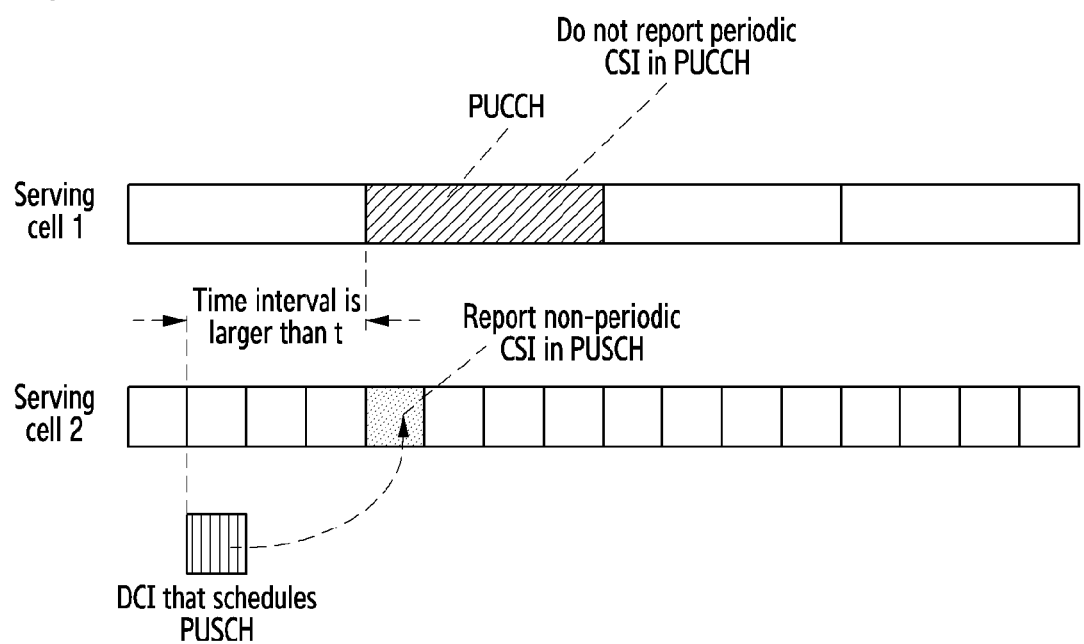

[Fig. 12]
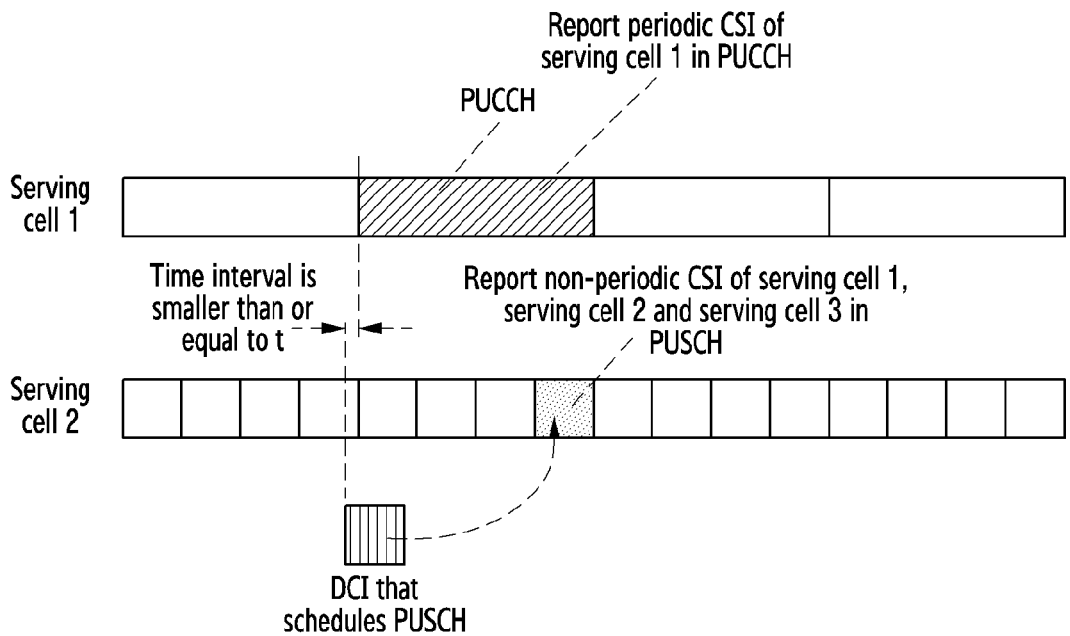
[Fig. 13]
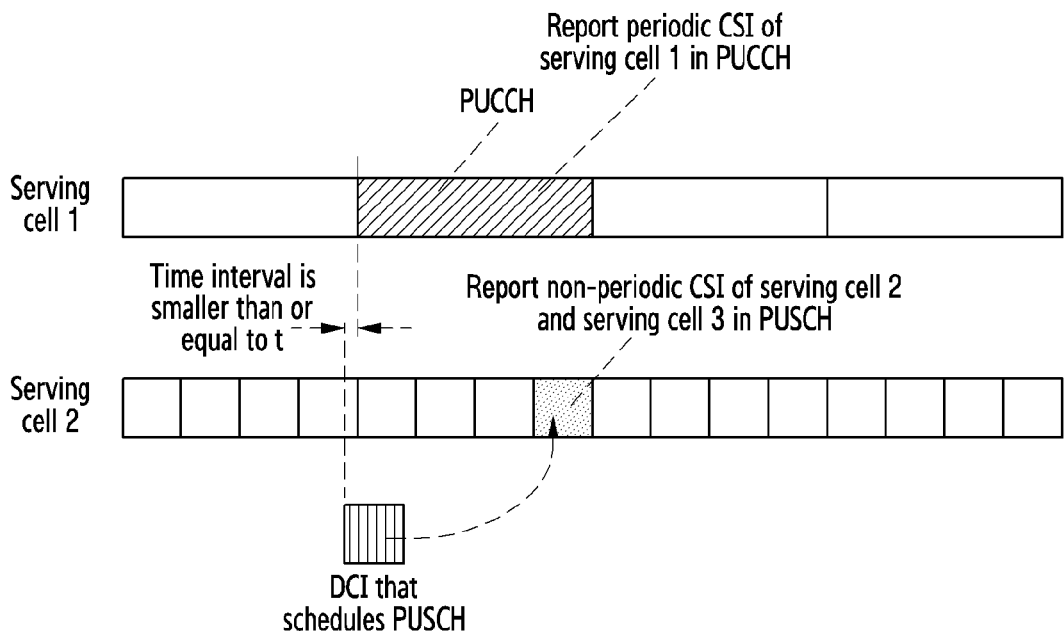
[Fig. 14]
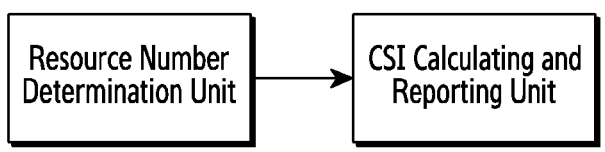

METHOD AND APPARATUS FOR REPORTING CHANNEL STATE INFORMATION

TECHNICAL FIELD

The present disclosure relates to wireless communication system, and in particular to a method and apparatus for reporting channel state information.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A terminal should report channel state information (CSI) to a base station, in order to properly receive data from the base station. The terminal may determine the CSI based on various factors, and how to determine the CSI may be affected by these factors.

DISCLOSURE OF INVENTION

Technical Problem

An aspect of the present disclosure is to provide a method and apparatus for reporting channel state information (CSI) in a wireless communication system.

Another aspect of the present disclosure is to provide a method and apparatus for determining the CSI in a wireless communication system.

Yet another aspect of the present disclosure is to provide a method and apparatus for determining the CSI in a wireless communication system using information on demodulation reference signals (DMRSs).

Solution to Problem

The present disclosure provides a method for reporting CSI, and the method can guarantee the performance of transmitting a PDSCH in a new radio transmission system.

A method for reporting channel state information (CSI) includes:
determining, by a user equipment (UE), a number of resources occupied by a demodulation reference signal (DMRS) used when calculating CSI;
determining, by the UE, a number of resources used to transmit a physical downlink shared channel (PDSCH) used when calculating the CSI according to the number of resources occupied by the DMRS; and
calculating, by the UE, the CSI according to the number of resources used to transmit the PDSCH determined, and reporting the CSI.

Preferably, before the determining a number of resources used to transmit a PDSCH used when calculating the CSI, the method further includes: determining, by the UE, a total number of resources occupied by time-domain transmission blocks where the PDSCH is located and a number of resources occupied by downlink control information (DCI) used when calculating the CSI; and
determining the number of resources used to transmit the PDSCH is performed according to the total number of resources and the number of resources occupied by the DCI.

Preferably, the determining a number of resources used to transmit a PDSCH used when calculating the CSI includes:
excluding the number of resources occupied by the DCI and the number of resources occupied by the DMRS from the total number of resources, but without excluding a number of resources occupied by a cell-specific reference signal (CRS), to obtain the number of resources occupied by the PDSCH; or
excluding the number of resources occupied by the DCI, the number of resources occupied by the DMRS and the number of resources occupied by the CRS to obtain the number of resources occupied by the PDSCH.

Preferably, determining the total number of resources occupied by the time-domain transmission blocks where the PDSCH is located used when calculating the CSI includes at least one of the following:
determining the total number of resources according to a preset;
determining the total number of resources according to at least one of a characteristic of a synchronization signal received, information carried in the synchronization signal, customized information received, or a customized signal received;
determining the total number of resources according to indication information carried in system information;
determining the total number of resources according to higher layer signaling or physical layer signaling received; or
in response to the UE receiving the higher layer signaling or the physical layer signaling received that indicates the total number of resources, determining the total number of resources according to the higher layer signaling or physical layer signaling received; in response the UE having not receiving the higher layer signaling or the physical layer signaling that indicates the total number of resources, determining the total number of resources according to the indication information carried in the system information or according to the preset, or determining the total number of resources according to at least one of the characteristic of the synchronization signal received, the information carried in the synchronization signal, the customized information received, or the customized signal received.

Preferably, for a non-periodic CSI or a non-persistent CSI, determining the total number of resources according to the physical layer signaling received includes:

determining the total number of resources according to information bits used to indicate performing CSI report in the physical layer signaling; or determining the total number of resources according to information bits used to indicate performing CSI report carried in the DCI.

Preferably, determining the number of resources occupied by the DCI used when calculating the CSI includes at least one of the following:

determining the number of resources occupied by the DCI according to a preset;

determining the number of resources occupied by the DCI according to at least one of a characteristic of a synchronization signal received, information carried in the synchronization signal, customized information received, or a customized signal received;

determining the number of resources occupied by the DCI according to indication information carried in system information;

determining the number of resources occupied by the DCI according to higher layer signaling or physical layer signaling received; or in response to the UE receiving the higher layer signaling or the physical layer signaling received that indicates the number of resources occupied by the DCI, determining the number of resources occupied by the DCI according to the higher layer signaling or physical layer signaling; in response the UE having not receiving the higher layer signaling or the physical layer signaling that indicates the number of resources occupied by the DCI, determining the number of resources occupied by the DCI according to the indication information carried in the system information or according to the preset, or determining the number of resources occupied by the DCI according to at least one of the characteristic of the synchronization signal received, the information carried in the synchronization signal, the customized information received, or the customized signal received; and determining the number of resources occupied by the DCI according to a mapping relationship between the total number of resources determined and the number of resources occupied by the DCI.

Preferably, for a non-periodic CSI or a non-persistent CSI, determining the number of resources occupied by the DCI according to the physical layer signaling received includes:

determining the number of resources occupied by the DCI according to information bits used to indicate performing CSI report in the physical layer signaling; or determining the number of resources occupied by the DCI according to information bits used to indicate performing CSI report carried in the DCI.

Preferably, the determining, by the UE, a total number of resources occupied by time-domain transmission blocks where the PDSCH is located and a number of resources occupied by downlink control information (DCI) used when calculating the CSI includes at least one of the following:

determining the total number of resources and the number of resources occupied by the DCI according to a preset;

determining the total number of resources and the number of resources occupied by the DCI according to at least one of a characteristic of a synchronization signal received, information carried in the synchronization signal, customized information received, or a customized signal received;

determining the total number of resources and the number of resources occupied by the DCI according to indication information carried in system information;

determining the total number of resources and the number of resources occupied by the DCI according to higher layer signaling or physical layer signaling received; or in response to the UE receiving the higher layer signaling or the physical layer signaling that indicates the total number of resources and the number of resources occupied by the DCI, determining the total number of resources and the number of resources occupied by the DCI according to the higher layer signaling or physical layer signaling received; in response the UE having not receiving the higher layer signaling or the physical layer signaling that indicates the total number of resources and the number of resources occupied by the DCI, determining the total number of resources and the number of resources occupied by the DCI according to the indication information carried in the system information or according to the preset, or determining the total number of resources and the number of resources occupied by the DCI according to at least one of the characteristic of the synchronization signal received, the information carried in the synchronization signal, the customized information received, or the customized signal received.

Preferably, determining the number of resources occupied by the DMRS used when calculating the CSI includes:

determining a pattern and a number of antenna ports of DMRS resources used when calculating the CSI, and determining the number of resources occupied by the DMRS according to the pattern and the number of antenna ports of the DMRS resources.

Preferably, determining the pattern of the DMRS resources used when calculating the CSI includes:

determining the pattern of the DMRS resources according to a preset;

determining the pattern of the DMRS resources according to at least one of a subcarrier width, a cyclic prefix (CP) length, or CP overhead of an orthogonal frequency division multiplexing (OFDM) symbol, the total number of resources, or a carrier frequency;

determining the pattern of the DMRS resources according to indication information carried in system information;

determining the pattern of the DMRS resources according to higher layer signaling or physical layer signaling received; or in response to the UE receiving the higher layer signaling or the physical layer signaling that indicates the pattern of the DMRS resources, determining the pattern of the DMRS resources according to the higher layer signaling or physical layer signaling received; in response the UE having not receiving the higher layer signaling or the physical layer signaling that indicates the pattern of the DMRS resources, determining the pattern of the DMRS resources according to the indication information carried in the system information or according to the preset, or determining the pattern of the DMRS resources according to at least one of the subcarrier width, the CP length, the CP overhead of the OFDM symbol, the total number of resources, or the carrier frequency.

Preferably, determining the pattern the number of antenna ports of the DMRS resources used when calculating the CSI includes:

determining the number of antenna ports of the DMRS resources according to a preset;

determining the number of antenna ports of the DMRS resources according to at least one of a subcarrier width, a cyclic prefix (CP) length, CP overhead of an orthogonal frequency division multiplexing (OFDM) symbol, the total number of resources, or a carrier frequency;

determining the number of antenna ports of the DMRS resources according to indication information carried in system information;

determining the number of antenna ports of the DMRS resources according to higher layer signaling or physical layer signaling received; or in response to the UE receiving the higher layer signaling or the physical layer signaling that indicates the number of antenna ports of the DMRS resources, determining the number of antenna ports of the DMRS resources according to the higher layer signaling or physical layer signaling received; in response the UE having not receiving the higher layer signaling or the physical layer signaling that indicates the number of antenna ports of the DMRS resources, determining the number of antenna ports of the DMRS resources according to the indication information carried in the system information or according to the preset, or determining the number of antenna ports of the DMRS resources according to at least one of the subcarrier width, the CP length, the CP overhead of the OFDM symbol, the total number of resources, or the carrier frequency.

Preferably, determining the pattern and the number of antenna ports of the DMRS resources used when calculating the CSI includes:

determining the pattern and the number of antenna ports of the DMRS resources according to a preset;

determining the pattern and the number of antenna ports of the DMRS resources according to at least one of a subcarrier width, a cyclic prefix (CP) length, CP overhead of an orthogonal frequency division multiplexing (OFDM) symbol, the total number of resources, or a carrier frequency;

determining the pattern and the number of antenna ports of the DMRS resources according to indication information carried in system information;

determining the pattern and the number of antenna ports of the DMRS resources according to higher layer signaling or physical layer signaling received; or in response to the UE receiving the higher layer signaling or the physical layer signaling that indicates the pattern and the number of antenna ports of the DMRS resources, determining the pattern and the number of antenna ports of the DMRS resources according to the higher layer signaling or physical layer signaling received; in response the UE having not receiving the higher layer signaling or the physical layer signaling that indicates the pattern and the number of antenna ports of the DMRS resources, determining the pattern and the number of antenna ports of the DMRS resources according to the indication information carried in the system information or according to the preset, or determining the pattern and the number of antenna ports of the DMRS resources according to at least one of the subcarrier width, the CP length, the CP overhead of the OFDM symbol, the total number of resources, or the carrier frequency.

An apparatus for reporting channel state information (CSI) includes: a resource number determination unit and a CSI calculating and reporting unit; in which the resource number determination unit is to determine a number of resources occupied by a demodulation reference signal (DMRS) used when calculating CSI, and determine a number of resources used to transmit a physical downlink shared channel (PDSCH) used when calculating the CSI according to the number of resources occupied by the DMRS; and the CSI calculating and reporting unit is to calculate the CSI according to the determined number of resources used to transmit the PDSCH, and report the CSI.

As can be seen from the above technical solutions, in the present disclosure, a UE determines the total number of resources occupied by time-domain transmission blocks where a PDSCH is located, the number of resources occupied by DCI and the number of resources occupied by DMRS when calculating CSI; determines the number of resources used to transmit the PDSCH when calculating the CSI after excluding the reference symbol and the DCI, according to the total number of resources occupied by the time-domain transmission blocks where the PDSCH is located, the number of resources occupied by the DCI and the number of resources occupied by the DMRS; in which the reference signal excluded at least includes a DMRS; and at last, calculates the CSI according to the total number of resources occupied by the time-domain transmission blocks where the PDSCH is located and the number of resources used to transmit the PDSCH, and reports the CSI. In this way, the technical solutions can accurately calculate the number of resources occupied by the DCI and DMRS, and can accurately calculate the number of resources used to transmit the PDSCH when calculating the CSI, so as to guarantee the performance of transmitting the PDSCH.

Advantageous Effects of Invention

According to various embodiments of the present disclosure, a performance of transmitting physical downlink shared channels (PDSCHs) can be improved.

BRIEF DESCRIPTION OF DRAWINGS

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is a schematic diagram of a frame structure in a frequency-division duplex system;

FIG. 6 is a schematic diagram of a subframe structure in a LTE system;

FIG. 7 is a schematic diagram of resources for PDSCH transmission when calculating DCI in a LTE system;

FIG. 8 is a flowchart of a method for reporting CSI provided according to the present disclosure;

FIG. 9 is a schematic diagram of resources occupied by DMRSs according to the present disclosure;

FIG. 10 is a first schematic diagram of periodic CSI and non-periodic CSI transmission according to the present disclosure;

FIG. 11 is a second schematic diagram of periodic CSI and non-periodic CSI transmission according to the present disclosure;

FIG. 12 is a third schematic diagram of periodic CSI and non-periodic CSI transmission according to the present disclosure;

FIG. 13 is a fourth schematic diagram of periodic CSI and non-periodic CSI transmission according to the present disclosure; and FIG. 14 is a schematic diagram of a basic structure of an apparatus for reporting CSI.

BEST MODE FOR CARRYING OUT THE INVENTION

To make the objects, technical schemes and advantages of the present disclosure clearer, the present disclosure will be described in detail hereinafter with reference to accompanying drawings and embodiments.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for reporting channel state information in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

According to various embodiments of the present disclosure, a terminal reports channel state information (CSI) to a base station. The terminal can be referred to as "user equipment (UE)," "mobile station," "subscriber station," "remote terminal," "wireless terminal," or "user device" as well as "terminal". The base station can be referred to as "access point (AP)," "eNodeB (eNB)," "5$^{th}$ generation (5G) node," "wireless point," "transmission/reception Point (TRP)".

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5$^{th}$ generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 upconverts the baseband signal into an RF band signal, transmits the converted signal through an antenna, and then downconverts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 1130 may determine an amount of first resources allocated for at least one demodulation reference signal (DMRS), determine an amount of second resources allocated for a physical downlink shared channel (PDSCH) based on the amount of the first resources, determine channel state information (CSI) based on the amount of the second resources, and transmit, to a base station, the CSI. For example, the controller 1130 may control the terminal to perform operations according to the exemplary embodiments of the present disclosure.

According to various embodiments of the present disclosure, the controller 1130 may determine an amount of third resources allocated for transmission blocks in which the PDSCH is located, and an amount of fourth resources allocated for downlink control information (DCI). Further, the controller 1130 may determine the amount of the second resources based on the amount of the third resources and the amount of the fourth resources.

According to various embodiments of the present disclosure, the controller may determine the amount of the second resources by excluding the amount of fourth resources and the amount of the first resources from the amount of the third resources.

According to various embodiments of the present disclosure, the amount of the third resources is determined based on at least one of a preset, at least one of a characteristic of a synchronization signal received, information in the synchronization signal, customized information received, or a customized signal received, indication information in system information, or a higher layer signaling or a physical layer signaling received.

According to various embodiments of the present disclosure, the amount of the third resources is determined based on at least one of information bits indicating to transmit the CSI in a physical layer signaling, or information bits indicating to transmit the CSI in the DCI.

According to the various embodiments of the present disclosure, the amount of the fourth resources is determined based on at least one of a preset, at least one of a synchronization signal received, information carried in the synchronization signal, customized information received, or a customized signal received, indication information in system information, a higher layer signaling or physical layer signaling received, or a mapping relationship between the amount of the third resources and the amount of the fourth resources.

According to various embodiments of the present disclosure, if the CSI is nonperiodic CSI or non-persistent CSI, the amount of the fourth resources is determined based on at least one of information bits indicating to transmit the CSI in a physical layer signaling, or information bits indicating to transmit the CSI in the DCI.

According to various embodiments of the present disclosure, the amount of the third resources and the amount of the fourth resources are determined based on at least one of a preset, at least one of a characteristic of a synchronization signal received, information in the synchronization signal, customized information received, or a customized signal received, indication information in system information, or a higher layer signaling or a physical layer signaling received.

According to various embodiments of the present disclosure, the controller 1130 may determine a pattern for the at least one DMRS and a number of antenna ports for the at least one DMRS, and determining the amount of the first resources based on the pattern for the at least one DMRS and the number of antenna ports for the at least one DMRS.

According to various embodiments of the present disclosure, the pattern for the at least one DRMS is determined based on at least one of a preset, at least one of a subcarrier width, a cyclic prefix (CP) length, CP overhead of a symbol, the amount of the third resources, or a carrier frequency, indication information in system information, or a higher layer signaling or a physical layer signaling received.

According to various embodiments of the present disclosure, the number of antenna ports for the at least one DRMS is determined based on at least one of a preset, at least one of a subcarrier width, a cyclic prefix (CP) length, CP overhead of a symbol, the amount of the third resources, or a carrier frequency, indication information in system information, or a higher layer signaling or a physical layer signaling received.

According to various embodiments of the present disclosure, the pattern for the at least one DRMS and the number of antenna ports for the at least one DMRS are determined based on at least one of a preset, at least one of a subcarrier width, a cyclic prefix (CP) length, CP overhead of a symbol, the amount of the third resources, or a carrier frequency, indication information in system information, or a higher layer signaling or a physical layer signaling received.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 802, a digital circuitry 404, a plurality of transmission paths 406-1 to 406-N, and an analog circuitry 408.

The encoding and circuitry 802 performs channel encoding. For the channel encoding, at least one of a low-density parity check (LDPC) code, a convolution code, and a polar code may be used. The encoding and circuitry 802 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

In a long term evolution advanced (LTE-A) system, the length of each radio frame is 10 ms, and each radio frame is divided into 10 subframes. One downlink transmission time interval (TTI) is defined for one subframe. FIG. 5 shows a schematic diagram of a frame structure in a frequency division duplex (FDD) system, in which each downlink subframe includes two slots, and for a normal cyclic prefix (CP) length, each slot contains 7 orthogonal frequency division multiplexing (OFDM) symbols; and for an extended CP length, each slot contains 6 OFDM symbols.

FIG. 6 is a schematic diagram of a subframe structure in a LTE system, in which first n OFDM symbols of the subframe are configured to transmit downlink control information (DCI), including control information of a physical downlink control channel (PDCCH) and other control information, where n is equal to 1, 2, or 3; and remaining OFDM symbols of the subframe are configured to transmit a physical downlink shared channel (PDSCH). The granularity of resource allocation is a physical resource block (PRB) pair, and one PRB contains 12 consecutive subcarriers in the frequency domain, and corresponds to one slot in the time aspect. Two PRBs within two slots on the same subcarriers in one subframe are defined as a PRB pair. Within each PRB pair, each resource element (RE) is the smallest unit of time-frequency resource, i.e., being equal to one subcarrier in the frequency aspect, and being equal to one OFDM symbol in the time aspect. REs may be used for different purposes. For example, a part of REs may be used to transmit a cell-specific reference signal (CRS), a user-specific demodulation reference signal (DMRS), a channel state information-reference signal (CSI-RS), a PDCCH and a PDSCH.

In the LTE system, PDSCH and PUSCH transmissions are scheduled by a PDCCH or an enhanced physical downlink control channel (EPDCCH), and resources for transmitting a PDSCH and a PUSCH are allocated through resource allocation signaling in the PDCCH/EPDCCH. The largest number of resources allocated for transmitting the PDSCH and the PUSCH are all PRB pairs within the system bandwidth, the smallest number of resources allocated for transmitting the PDSCH and the PUSCH are a PRB pair within the system bandwidth, and the granularity of the resource allocation is a PRB pair. For a normal CP system, there are 14 OFDM symbols in the time domain, and for an extended CP system, there are 12 OFDM symbols in the time domain.

When a base station schedules a PDSCH, to enable the base station to determine a suitable transmission modulation and coding scheme (MCS) according to the quality of the channel, the UE needs to feed back channel state information (CSI), and CSI report includes periodic CSI report and non-periodic CSI report. In the LTE system, when the UE feeds back CSI, it makes an assumption as the following: obtaining a CP characteristic of the system, i.e., whether the system using an extended CP or a normal CP, by performing detection, and then determining the number of OFDM symbols of each subframe according to the CP characteristic; for the normal CP, each subframe including 14 OFDM symbols, and for the extended CP, each subframe including 12 OFDM symbols; and obtaining the number of antenna ports of CRS by performing detection, and specifically, the CRS may have 1, 2, or 4 antenna ports, and determining which RSs cannot be used to transmit the PDSCH according to the number of antenna ports of the CRS; and assuming that first 3 OFDM symbols in each subframe are used for control signaling transmission, and cannot be used for PDSCH transmission. Then, when calculating the CSI, the number of resources for transmitting the PDSCH are determined according to the total number of OFDM symbols determined according to the CP characteristic minus 3 and excluding the number of resources for transmitting the CRS from the remaining number of OFDM symbols, as shown in FIG. 7. Resources occupied by other signals (e.g., a CSI-RS, or a synchronization signal) possibly transmitted are not taken into consideration when the UE calculates the CSI.

In a new radio (NR) transmission system, there are the following changes in transmission resources: resources for transmitting DCI no longer occupy an entire system bandwidth, and for the normal CP, the length of resource blocks for transmitting a PDSCH is no longer definitely 14 OFDM symbols, and CRS is no longer used as an essential factor to demodulate a PDSCH, but the DMRS is used. When considering the above changes, if a traditional method is used to calculate CSI, it cannot determine resources for transmitting a PDSCH accurately, which affects the performance of transmitting the PDSCH.

First, problems that may be caused due to the various changes in transmission resources in a new radio transmission system will be analyzed. Firstly, since resources for transmitting DCI no longer occupy an entire system bandwidth, therefore, when calculating CSI, the resources needed to transmit the DCI need to be reconsidered; secondly, since for the normal CP, the time-domain length of physical resource blocks for transmitting a PDSCH is no longer definitely 14 OFDM symbols, but may be 7, 28, or 56 OFDM symbols, and the number of OFDM symbols for transmitting a PDSCH may not totally be decided according to the characteristic of the CP, therefore, when calculating the CSI, the total number of resources for transmitting the PDSCH needs to be reconsidered; and since CRS is no longer used as an essential factor to demodulate a PDSCH, but the DMRS is used, therefore, when calculating the CSI, a resource for transmitting a reference signal, but not for transmitting the PDSCH should be reconsidered. Based on these, in the present disclosure, how the transmission resources are occupied should be reconsidered, and thus an object of the present disclosure is to accurately determine resources used to transmit a PDSCH, and further to enable a better performance of transmitting the PDSCH.

FIG. 8 is a flowchart of a method for reporting CSI provided according to the present disclosure, and as shown in FIG. 8, the method includes the following steps:

Step 801: a UE determines the number of resources occupied by a DMRS used when calculating CSI.

According to various embodiments of the present disclosure, 'the number of resources' may be referred to as an example of 'an amount of resources'. Since demodulating a PDSCH in all transmission modes in NR systems uses the DMRS, thereby causing the number of DMRSs to be relatively large, and have larger influence on the performance of transmitting the PDSCH, therefore, it is necessary to determine the accurate number of resources occupied by the DMRS.

Step 802: the UE determines the number of resources used to transmit a physical downlink shared channel (PDSCH) used when calculating the CSI according to the number of resources occupied by the DMRS determined in Step 801.

When the UE determines the number of resources used to transmit the PDSCH, it performs the determination according to the number of resources occupied by the DMRS determined in Step 801, so as to be able to accurately determine the number of resources used to transmit the PDSCH, and further guarantee the performance of transmitting the PDSCH.

To be specific, when the UE calculates the number of resources used to transmit the PDSCH, preferably, the UE may exclude resources of DCI and reference signals from the total number of resources occupied by time-domain transmission blocks where the PDSCH is located, to determine the remaining resources for transmitting the PDSCH when calculating the CSI. The reference signals excluded at least include the DMRS, and CRS and/or CSI-RS may be excluded or not. For TDD, a slot may include three parts; first part of slot is downlink OFDM symbols, second part of slot is gap, third part of slot is uplink OFDM symbols, and for this case, when the UE calculates the number of resources used to transmit the PDSCH, preferably, the UE may exclude resources in the OFDM symbols of gap part and uplink part from the total number of resources occupied by time-domain transmission blocks where the PDSCH is located. And the number of OFDM symbols occupied by the gap part and uplink part may be decided by preset, higher layer signaling, physical layer signaling.

More specifically, the total number of resources occupied by the time-domain transmission blocks where the PDSCH is located used when calculating the CSI may refer to the total number of resources of OFDM symbols in the time-domain transmission blocks where the PDSCH is located, and the time-domain transmission blocks refers to those within a slot, a mini-slot, or multiple slots. As described in the foregoing, since the DCI may not occupy the entire bandwidth, therefore, it is necessary to determine the number of resources occupied by the DCI when calculating the CSI. The CSI described herein at least includes all of information in current CSI, e.g., a rank indication (RI), a precoding matrix indicator (PMI) and/or a channel quality indictor (CQI), and the CSI may include other newly added information as needed.

Step 803: the UE calculates the CSI according to the number of resources used to transmit the PDSCH used when calculating the CSI determined according to Step 802, and reports the CSI.

In the following, the technical solution of the present disclosure will be further described through several preferable embodiments.

Embodiment 1

In the present embodiment, a method for determining the total number of resources occupied by time-domain transmission blocks where a PDSCH is located when a UE calculates CSI will be described. Specifically, since the CSI is calculated according to corresponding time-domain transmission blocks, and therefore, the total number of resources corresponds to the total number of OFDM symbols in the time-domain transmission blocks (e.g., within a subframe or a slot, or multiple slots, or a mini-slot, or a part of slot), i.e., the total number of OFDM symbols in the time-domain transmission blocks. There are several methods for determining the total number of OFDM symbols in the time-domain transmission blocks as follows.

Method 1:

For the total number M (M is a positive integer) of OFDM symbols in the time-domain transmission blocks, the UE may determine it according to a preset, and detailed information of the preset may be defined by means of a protocol. For example, the protocol specifies that the total number M of OFDM symbols in the time-domain transmission blocks is 14 or 7.

Method 2:

For the total number M of OFDM symbols in the time-domain transmission blocks, the UE may determine it according to a characteristic of a synchronization signal received or information carried in the synchronization signal, or according to other information or signals (e.g., customized information or a customized signal) received, in which the signal may be a reference signal, and the information may be signaling transmitted. For example, the UE may determine the total number of OFDM symbols in the time-domain transmission blocks according to at least one of a subcarrier bandwidth, a CP length, or a sequence of synchronization signals of the OFDM symbols determined according to the synchronization signal received.

Method 3:

For the total number M of OFDM symbols in the time-domain transmission blocks, the UE may determine it according to indication information in system information (e.g., a master information block (MIB) or a system information block (SIB)). For example, in the system information, N (N is a positive integer, determined according to a protocol, and e.g., N is equal to 1) bits are used to indicate the total number M of OFDM symbols in the time-domain transmission blocks, and mapping relationships between the total numbers of OFDM symbols in the time-domain transmission blocks and the indication information of N bits may be as shown in Table 1.

TABLE 1

Mapping relationship between the total number M of OFDM symbols in the time-domain transmission blocks and the indication information

| Value of the indication information | Total number M of OFDM Symbols in the time-domain transmission blocks |
| --- | --- |
| 0 | 7 |
| 1 | 14 |

Method 4:

For the total number M of OFDM symbols in the time-domain transmission blocks, the UE may determine it according to higher layer signaling received. For example, the UE may determine that the total number of OFDM symbols in the time-domain transmission blocks is M, and for example, M may be equal to 7 or 14, by receiving a configuration configured by the higher layer signaling.

Method 5

For the total number M of OFDM symbols in the time-domain transmission blocks, the UE may determine it according to physical layer signaling received. To be specific, the UE may determine that the total number of OFDM symbols in the time-domain transmission blocks indicated is M by receive the physical layer signaling. For example, N (N is a positive integer, determined according to a protocol or configured by higher layer signaling, e.g., N is equal to 1) bits are used to indicate the total number M of OFDM symbols in the time-domain transmission blocks, and mapping relationships between the total number M of OFDM symbols in the time-domain transmission blocks and the indication information of N bits may be as shown in Table 1. According to the indication by the physical layer signaling, the UE may determine the total number of OFDM symbols in the time-domain transmission blocks dedicated for periodic CSI or non-periodic CSI.

In addition, since in traditional physical layer signaling, it needs to contain information that indicates CSI report (CQI request), and the information is located in DCI, for non-periodic CSI or semi-persistent CSI, when using the physical layer signaling to indicate M, it may be combined with the information that indicates the CSI report. In the following, two exemplary ways of indicating are provided: 1. using the bits of the information that indicate the CSI report, meanwhile, to indicate the total number M of OFDM symbols in the time-domain of transmission blocks of non-periodic CSI, that is, jointly indicating the information that indicate the CSI report and the value of M, e.g., using 2 bits of information to jointly indicate the CSI report and the value of M; and 2. in the DCI of the information that indicates the CSI report, using preset bits to indicate the total number M of OFDM symbols in the time-domain transmission blocks of non-periodic CSI, that is, in the DCI, using different bits of information to indicate the information of the CSI report and the value of M, and a detailed method for indicating the value of M may use the method in Table 1.

Method 6:

For the total number M of OFDM symbols in the time-domain transmission blocks, if the UE has received a higher layer signaling configuration or a physical layer signaling indication that indicates the total number M of OFDM symbols, then when the UE calculates the CSI, the UE determines the total number M of OFDM symbols in the time-domain transmission blocks according to the higher layer signaling configuration or the physical layer signaling indication received by the UE, and use it to calculate the CSI; if the UE has not received a higher layer signaling configuration that indicating the total number M of OFDM symbols, and has not received a physical layer signaling indication that indicates the total number M of OFDM symbols, then the UE may determine the total number M of OFDM symbols in the time-domain transmission blocks according to the processing in the Method 1, Method 2, or Method 3 of the present embodiment when calculating the CSI, and use it to calculate the CSI.

Embodiment 2

In the present embodiment, a method for determining the number of resources occupied for transmitting the DCI when calculating the CSI will be described. In the above Embodiment 1, when calculating the CSI, the total number of resources occupied by the time-domain transmission blocks where the PDSCH is located is determined based on the size of a certain time-domain transmission block A, and accordingly, in the present embodiment, the number of resources occupied by the DCI is also determined based on the size of the time-domain transmission block A. That is, the number of resources in the present embodiment and the number of resources in Embodiment 1 are based on the same size of time-domain transmission block. Specifically, the present embodiment provides several methods for determining the number of OFDM symbols for transmitting the DCI in the time-domain transmission blocks as follows.

Method 1:

For the number M1 (M1 is an integer, M>=0) of OFDM symbols for transmitting the DCI in the time-domain transmission blocks, the UE may determine it according to a preset, and detail information of the preset may be defined by means of a protocol. For example, the protocol specifies that the number M1 of OFDM symbols for transmitting the DCI in the time-domain transmission blocks is 3.

Or the UE may determine the total number M of OFDM symbols in the time-domain transmission blocks and the number M1 of OFDM symbols for transmitting the DCI in the time-domain transmission blocks at the same time according to the preset. Detailed information of the preset may be defined by means of the protocol. For example, the protocol specifies that the number M of OFDM symbols in the time-domain transmission blocks is 7 and the number M1 of OFDM symbols for transmitting the DCI is N1, or that the number M of OFDM symbols in the time-domain transmission blocks is 14 and the number M1 of OFDM symbols for transmitting the DCI is N2, where N1 and N2 are all positive integers and may be determined according to the protocol, or may be configured by higher layer signaling.

Method 2:

For the total number M of OFDM symbols in the time-domain transmission blocks, the UE may determine it according to a characteristic of a synchronization signal received, or according to information carried in the synchronization signal, or according to other information or signals (e.g., customized information or a customized signal) received, in which the signal may be a reference signal, and the information may be signaling transmitted. For example, the UE may determine the total number of OFDM symbols in the time-domain transmission blocks according to at least one of a subcarrier bandwidth, a CP length, or a sequence of synchronization signals of the OFDM symbols determined according to the synchronization signal received.

Or the UE may determine the total number M of OFDM symbols in the time-domain transmission blocks and the number M1 of OFDM symbols for transmitting the DCI in the time-domain transmission blocks at the same time according to the characteristic of the synchronization signal, or according to the information carried in the synchronization signal received, or according to other information or signal received (e.g., customized information or a customized signal), in which the signal may be a reference signal, and the information may be signaling transmitted. For example, the UE determines the total number M of OFDM symbols in the time-domain transmission blocks and the number M1 of OFDM symbols for transmitting the DCI in the time-domain transmission blocks according to at least one of the subcarrier bandwidth, the CP length, or the sequence of synchronization signals of the OFDM symbols determined according to the synchronization signal received.

Method 3:

For the number M1 of OFDM symbols for transmitting the DCI in the time-domain transmission blocks, the UE may determine it according to indication information in system information (e.g., a master information block (MIB) or a system information block (SIB)). For example, in the system information, N (N is a positive integer, determined according to a protocol, e.g., N is equal to 2) bits are used to indicate the number M1 of OFDM symbols for transmitting the DCI in the time-domain transmission blocks, and mapping relationships between the numbers M1 of OFDM symbols for transmitting the DCI in the time-domain transmission blocks and the indication information of N bits may be as shown in Table 2 or Table 3.

TABLE 2

Mapping relationship between the number M1 of OFDM symbols for transmitting the DCI in the time-domain transmission blocks and the indication information

| Value of the indication information | Number M1 of OFDM symbols for transmitting the DCI in the time-domain transmission blocks |
| --- | --- |
| 00 | 0 |
| 01 | 1 |
| 10 | 2 |
| 11 | 3 |

TABLE 3

Mapping relationship between the number M1 of OFDM symbols for transmitting the DCI in the time-domain transmission blocks and the indication information

| Value of the indication information | Number M1 of OFDM symbols for transmitting the DCI in the time-domain transmission blocks |
|---|---|
| 0 | M1'(M1'is an integer, determined according to a protocol, or configured by higher layer signaling) |
| 1 | M2'(M2' is an integer, determined according to a protocol, or configured by higher layer signaling) |

Or, the UE may determine the total number M of OFDM symbols in the time-domain transmission blocks and the number M1 of OFDM symbols for transmitting the DCI in the time-domain transmission blocks according to the indication information in the system information (e.g., the master information block (MIB)) or the system information block (SIB)). For example, N (N is a positive integer, determined according to the protocol, e.g., N is equal to 1) bits are used to indicate the total number M of OFDM symbols in the time-domain transmission blocks and the number M1 of OFDM for transmitting the DCI in the time-domain transmission blocks, and mapping relationships between the total number M of OFDM symbols in the time-domain transmission blocks and the number M1 of OFDM symbols for transmitting the DCI in the time-domain transmission blocks are as shown in Table 4.

TABLE 4

Mapping relationship between the total number M of OFDM symbols in the time-domain transmission blocks and the number M1 of OFDM symbols for transmitting the DCI in the time-domain transmission blocks and the indication information of N bits

| Value of the indication information | Total number M of the OFDM symbols in time-domain transmission blocks | Number M1 of OFDM Symbols for transmitting the DCI in the time-domain transmission blocks |
|---|---|---|
| 0 | 7 | N1(N1 is an integer, determined according to a protocol, or configured by higher layer signaling) |
| 1 | 14 | N2(N2 is an integer, determined according to a protocol, or configured by higher layer signaling) |

Method 4:

For the number M1 of OFDM symbols for transmitting the DCI in the time-domain transmission blocks, the UE may determine it according to higher layer signaling received. For example, the UE determines that the number M1 of OFDM symbols for transmitting the DCI in the time-domain transmission blocks is M1 by receiving a configuration configured by the higher layer signaling, and for example, M1 may be equal to 0, 1, 2, or 3.

Or the UE may determine the total number M of OFDM symbols in the time-domain transmission blocks and the number M1 of OFDM symbols for transmitting the DCI in the time-domain transmission blocks according to the higher layer signaling received. For example, N(N is a positive integer, determined according to a protocol, for example, N is equal to 1) bits are used to indicate the total number M of OFDM symbols in the time-domain transmission blocks and the number M1 of OFDM symbols for transmitting the DCI in the time-domain transmission blocks. Mapping relationships between the total number M of OFDM symbols in the time-domain transmission blocks and the number M1 of OFDM symbols for transmitting the DCI in the time-domain transmission blocks and the indication information are as shown in Table 4.

Method 5:

For the number M1 of OFDM symbols for transmitting the DCI in the time-domain transmission blocks, the UE may determine it according to physical layer signaling received. Specifically, the UE may determine that the number of OFDM symbols for transmitting the DCI in the time-domain transmission blocks indicated is M1 by receiving the physical layer signaling. For example, N (N is a positive integer, determined according to the protocol or configured by higher layer signaling, e.g., N is equal to 2) bits are used to indicate that the number M1 of OFDM symbols for transmitting the DCI in the time-domain transmission blocks is M1. Mapping relationships between the number M1 of OFDM symbols for transmitting the DCI in the time-domain transmission blocks and the indication information of N bits may be as shown in Table 2 or Table 3. The UE may determine the number of OFDM symbols for transmitting the DCI in the time-domain transmission blocks dedicated for periodic CSI or non-periodic CSI according to an indication indicated by the physical layer signaling.

In additional, since in traditional physical layer signaling, it needs to contain information that indicates CSI report, and the information is located in DCI, for nonperiodic CSI or non-persistent CSI, when using the physical layer signaling to indicate M1, it may be combined with the information that indicates the CSI report. In the following, two exemplary ways of indicating are provided: 1. using the bits of the information that indicate the CSI report, meanwhile, to indicate the number M1 of OFDM symbols for transmitting the DCI in the time-domain transmission blocks of non-periodic CSI, that is, jointly indicating the information that indicates the CSI report and the value of M1, e.g., using 2 bits of information to jointly indicate the CSI report and the value of M1; 2. in the DCI of the information that indicates the CSI report, using preset bits to indicate the number M1 of OFDM symbols for transmitting the DCI in the time-domain transmission blocks of non-periodic CSI, that is, in the DCI, using different bits of information to indicate the information of the CSI report and the value of M1, and a detailed method for indicating the value of M1 may use the method in Table 2 or Table 3.

Or, the UE may determine the total number M of OFDM symbols in the time-domain transmission blocks and the number M1 of OFDM symbols for transmitting the DCI in the time-domain transmission blocks according to the indication in the physical layer signaling. For example, N (N is a positive integer, determined according to the protocol, for example, N is equal to 1) bits are used to indicate the total number M of OFDM symbols in the time-domain transmission blocks and the number M1 of OFDM symbols for transmitting the DCI in the time-domain transmission blocks, and mapping relationships between the total number M of OFDM symbols in the time-domain transmission blocks and the number M1 of OFDM symbols for transmitting the DCI in the time-domain transmission blocks and the indication information of N bits are as shown in Table 4.

Method 6:

For the number M1 of OFDM symbols for transmitting the DCI in the time-domain transmission blocks, if the UE has received a higher layer configuration or a physical layer signaling indication that indicates the number M1 of OFDM symbols for transmitting the DCI in the time-domain transmission blocks, the UE determines the number M1 of OFDM symbols for transmitting the DCI in the time-domain transmission blocks according to the higher layer signaling configuration or according to the physical layer signaling indication, and uses it to calculate the CSI; and if the UE has not received a higher layer signaling configuration that indicates the number M1 of OFDM symbols for transmitting the DCI, and has not received a physical layer signaling indication that indicates the number M1 of OFDM symbols for transmitting the DCI, then the UE may determine the number M1 of OFDM symbols for transmitting the DCI in the time-domain transmission blocks according to the processing in the Method 1, Method 2 or Method 3 of the present embodiment, when calculating the CSI, and use it to calculate the CSI.

Or, for the number M1 of OFDM symbols for transmitting the DCI in the time-domain transmission blocks, if the UE has received a higher layer signaling configuration or a higher layer signaling indication that indicates M and M1 at the same time, then when the UE calculates the CSI, it may determine the total number M of OFDM symbols in the time-domain transmission blocks where the PDSCH is located and the number M1 of OFDM symbols for transmitting the DCI in the time-domain transmission blocks according to the higher layer signaling configuration or according to the physical layer signaling indication, and then use them to calculate the CSI; and if the UE has not received a higher layer signaling configuration that indicates M and M1 at the same time, and has not received a physical layer signaling indication that indicates M and M1 at the same time, then when the UE calculates the CSI, it may determine the total number M of OFDM symbols in the time-domain transmission blocks and the number M1 of OFDM symbols for transmitting the DCI in the time-domain transmission blocks at the same time according to the processing in the Method 1, Method 2 or Method 3, and use them to calculate the CSI.

Method 7:

For the number M1 of OFDM symbols for transmitting the DCI in the time-domain transmission blocks, the UE may determine it according to the total number M of OFDM symbols in the time-domain transmission blocks determined and a preset mapping relationship between M and M1, for example, the total number M of OFDM symbols in the time-domain transmission blocks is 7, 14, 28, or 56, and mapping relationships between the total number M of OFDM symbols in the time-domain transmission blocks and the number M1 of the OFDM symbols for transmitting the DCI in the time-domain transmission blocks may be as shown in Table 5. The UE may determine the number M1 of the OFDM symbols for transmitting the DCI according to Table 5 and the value of M.

TABLE 5

Mapping relationship between the total number M of OFDM symbols in the time-domain transmission blocks and the number M1 of the OFDM symbols for transmitting the DCI in the time-domain transmission blocks

| Total number M of the OFDM symbols in the time-domain transmission blocks | Number M1 of the OFDM symbols for transmitting the DCI in the time-domain transmission blocks |
|---|---|
| 7 | N1 |
| 14 | N2 |

N1 and N2 are positive integers, determined according to a protocol, or configured by higher layer signaling.

Embodiment 3

In the present embodiment, it describes a method for determining resources occupied by various types of reference symbols when calculating the CSI.

First of all, the embodiment describes that resources occupied by which reference symbols should be taken into consideration when the CSI is calculated. Since in a NR system, the DMRS is more often used as a reference signal to demodulate a PDSCH, therefore, the resources occupied by the DMRS have more influence on the performance of transmitting the PDSCH, and therefore, when the CSI is calculated, no matter in which mode of transmission, the resources occupied by the DMRS should be excluded. Since CRS is rarely used to demodulate a PDSCH, but may be used for RRM measurement, therefore, the period of transmission is getting longer, and the density of transmission is getting smaller. Based on these, the resources occupied by the CRS have less influence on the performance of the PDSCH transmission, and therefore, when the CSI is calculated, the resources occupied by the CRS may not be excluded, or if necessary, the resources occupied by the CRS may be excluded when calculating the CSI.

As can be seen from the foregoing, when excluding the resources occupied by the reference symbols when calculating the CSI, the resources occupied by the DMRS at least should be excluded. In the following, what is described is how to determine the number of resources occupied by the DMRS when calculating the CSI. Since in the NR system, the subcarrier width, the CP length, and the number of the OFDM symbols occupied by the time-domain transmission blocks for transmitting a PDSCH in the NR are variable, therefore, the pattern and the number of antenna ports of the DMRS are all variable. The pattern of a DMRS described herein is the time-frequency density of each DMRS antenna port, as shown in FIG. 9, and the resources occupied by the DMRS are resources occupied by the patterns of all DMRS antenna ports. Therefore, when determining the number of resources occupied by the DMRS, the pattern and the number of antenna ports of the DMRS resources need to be determined. Similarly to Embodiment 2, in the present embodiment, the pattern and the number of antenna ports of the DMRS resources are determined based on the size of the time-domain transmission block A. That is, the pattern and the number of antenna ports of the DMRS resources and the total number of resources occupied by the time-domain resource blocks where the PDSCH is located determined in Embodiment 1 are based on the same size of time-domain transmission block.

In the following, several methods for determining the pattern of the DMRS resources are shown.

Method 1:

For the pattern of the resources for transmitting the DMRS in the time-domain transmission blocks, the UE may determine it according to a preset, and detailed information of the preset may be defined according to a protocol. For example, the protocol defining a default pattern of the DMRS resources.

Method 2:

For the pattern of the resources for transmitting the DMRS in the time-domain transmission blocks, the UE may determine it according to at least one of a subcarrier bandwidth, a CP length, CP overhead of the OFDM symbols for transmitting the PDSCH determined, the total number of the resources in the time-domain transmission blocks where the PDSCH is located, or a carrier frequency.

Method 3

For the pattern of the resources for transmitting the DMRS in the time-domain transmission blocks, the UE may determine it according to indication information carried in system information (e.g., a master information block (MIB) or a system information block (SIB)). For example, in the system information, N (N is a positive integer, determined according to a protocol, e.g., N is equal to 2) bits are used to indicate the pattern of the resources for transmitting the DMRS in the time-domain transmission blocks, and mapping relationships between the pattern of the resources for transmitting the DMRS in the time-domain transmission blocks and the indication information of N bits may be as shown in Table 6.

TABLE 6

Mapping relationship between the pattern of the resources for transmitting the DMRS in the time-domain transmission blocks and the indication information

| Value of the indication information | Pattern of the resources for transmitting the DMRS in the time-domain transmission blocks |
|---|---|
| 00 | Pattern 1 |
| 01 | Pattern 2 |
| 10 | Pattern 3 |
| 11 | Pattern 4 |

Method 4:

For the pattern of the resources for transmitting the DMRS in the time-domain transmission blocks, the UE may determine it according to higher layer signaling received. For example, the UE determines the pattern of the resources for transmitting the DMRS in the time-domain transmission blocks according to a configuration configured by the higher layer signaling received.

Method 5:

For the pattern of the resources for transmitting the DMRS in the time-domain transmission blocks, the UE may determine it according to physical layer signaling received. Specifically, the UE may determine the pattern of the resources for transmitting the DMRS in the time-domain transmission blocks indicated by receiving the physical layer signaling. For example, N (N is a positive integer, configured by a protocol or configured by higher layer signaling, e.g., N is equal to 2) bits are used to indicate the pattern of the resources for transmitting the DMRS in the time-domain transmission blocks, and mapping relationships between the pattern of the resources for transmitting the DMRS in the time-domain transmission blocks and the indication information of N bits may be as shown in Table 6.

Method 6:

For the pattern of the resources for transmitting the DMRS in the time-domain transmission blocks, if the UE has received a higher layer signaling configuration or a physical layer signaling indication, then when calculating the CSI, the UE determines the pattern of the resources for transmitting the DMRS in the time-domain transmission blocks according to the higher layer signaling configuration or the physical layer signaling indication received; and if the UE neither has received a higher layer signaling configuration that indicates the pattern of the resources for transmitting the DMRS in the time-domain transmission blocks, nor has received a physical layer signaling indication that indicates the pattern of the resources for transmitting the DMRS in the time-domain transmission blocks, then the UE determines the pattern of the resources for transmitting the DMRS in the time-domain transmission blocks according to the processing in the Method 1, Method 2, or Method 3 of the present embodiment, and uses it to calculate the CSI.

In the following, several methods for determining the number of antenna ports of the DMRS resources when calculating the CSI are described.

Method 1:

For the number of antenna ports for transmitting the DMRS in the time-domain transmission resources, the UE may determine it according to a preset. Detailed information of the preset may be defined by a protocol. For example, the protocol defines that the number of antenna ports for transmitting a DMRS in the time-domain transmission blocks is 4.

Or the UE may determine the pattern and the number of antenna ports of the DMRS resources when calculating the CSI according to the preset. Detailed information on the preset may be defined by a protocol. For example, the protocol defines that the pattern of the DMRS resource is a pattern 1 and the number of antenna ports of the DMRS is M1', or that the pattern of the DMRS resource is pattern 2 and the number of antenna ports of the DMRS is M2'. M1' and M2' are integers, and they may be determined according to the protocol, or may be configured by higher layer signaling.

Method 2:

For the number of antenna ports for transmitting a DMRS in the time-domain transmission blocks, the UE may determine it according to at least one of a subcarrier bandwidth, a CP length, CP overhead of the OFDM symbols for transmitting the PDSCH determined, the total number of the resources for transmitting the PDSCH in the time-domain transmission blocks and a carrier frequency.

Or the UE may determine the pattern and the number of antenna ports of the DMRS resources in the time-domain transmission blocks according to at least one of the subcarrier bandwidth, the CP length, or the CP overhead of the OFDM symbols for transmitting the PDSCH, the total number of the resources for transmitting the PDSCH in the time-domain transmission blocks, or the carrier frequency determined.

Method 3:

For the number of antenna ports for transmitting the DMRS in the time-domain transmission blocks, the UE may determine it according to indication information carried in system information (e.g., a master information block (MIB) or a system information block (SIB)). For example, in the system information, N (N is a positive integer, determined according to a protocol, e.g., N is equal to 2) bits are used to indicate the number of antenna ports for transmitting the DMRS in the time-domain transmission blocks, and mapping relationships between the pattern and the number of antenna ports of the resources for transmitting the DMRS in the time-domain transmission blocks and the indication information may be as shown in Table 7.

TABLE 7

Mapping relationship between the pattern and the number of antenna ports of the DMRS resources in the time-domain transmission blocks and the indication information of N bits

| Value of the indication information | Pattern of the DMRS resources in the time-domain transmission blocks | Number of antenna ports for DMRS transmission in the time-domain transmission blocks |
|---|---|---|
| 0 | Pattern 1 | M1' (M1' is an integer, determined according to a protocol, or configured by higher layer signaling) |

TABLE 7-continued

Mapping relationship between the pattern and the number of antenna ports of the DMRS resources in the time-domain transmission blocks and the indication information of N bits

| Value of the indication information | Pattern of the DMRS resources in the time-domain transmission blocks | Number of antenna ports for DMRS transmission in the time-domain transmission blocks |
| --- | --- | --- |
| 1 | Pattern 2 | M2'(M2' is an integer, determined according to a protocol, or configured by higher layer signaling) |

Method 4

For the number of antenna ports for transmitting the DMRS in the time-domain transmission blocks, the UE may determine it according to higher layer signaling received.

Or, the UE may determine the pattern and the number of antenna ports of the DMRS resources in the time-domain transmission blocks at the same time according to the higher layer signaling received. For example, N (N is a positive integer, determined according to a protocol, e.g., N is equal to 1) bits are used to indicate the pattern and the number of antenna ports of the DMRS resources in the time-domain transmission blocks, and mapping relationships between the pattern and the number of antenna ports of the DMRS resources in the time-domain transmission blocks and the indication information are as shown in Table 7.

Method 5:

For the number of antenna ports for transmitting the DMRS in the time-domain transmission resources, the UE may determine it according to physical layer signaling received. To be specific, the UE may determine the number of antenna ports for transmitting the DMRS in the time-domain transmission resources indicated by receiving the physical layer signaling, e.g., N (N is a positive integer, determined according to a protocol, or configured by higher layer signaling, e.g., N is equal to 1) bits are used to indicate the number of antenna ports for transmitting the DMRS in the time-domain transmission blocks, and a detailed way of indicating may be as shown in
Table 8.

TABLE 8

Mapping relationship between the number of antenna ports for transmitting the DMRS and the indication information

| Value of the indication information | Number of antenna ports for transmitting the DMRS |
| --- | --- |
| 0 | M1'(M1' is a positive integer, determined according to a protocol, or configured by higher layer signaling) |
| 1 | M2' (M2' is a positive integer, determined according to a protocol, or configured by higher layer signaling) |

Or, the UE may determine the pattern and the number of antenna ports of DMRS resources in the time-domain transmission blocks according to the indication information in the physical layer signaling, e.g., N (N is a positive integer, determined according to a protocol, e.g., N is equal to 1) bits are used to indicate the pattern and the number of antenna ports of DMRS resources in the time-domain transmission blocks, and mapping relationships between the pattern and the number of antenna ports of DMRS resources in the time-domain transmission blocks and the indication information of N bits are as shown in Table 7.

Method 6

For the number of antenna ports for transmitting the DMRS in the time-domain transmission blocks, if the UE has received a higher layer signaling configuration or a physical layer signaling indication that indicates the number of antenna ports for transmitting the DMRS, then the UE determines the number of antenna ports for transmitting the DMRS in the time-domain transmission blocks according to the higher layer signaling configuration or the physical layer signaling indication received, and uses it to calculate the CSI; and if the UE has not received a higher layer signaling configuration that indicates the number of antenna ports of the DMRS, and has not received a physical layer signaling indication that indicates the number of antenna ports of the DMRS, then the UE may determine the number of antenna ports for transmitting the DMRS in the time-domain transmission blocks according to the processing in the Method 1, Method 2, or Method 3 of the present embodiment, and uses it to calculate the CSI.

Or, for the number of antenna ports for transmitting the DMRS in the time-domain transmission blocks, if the UE has received a higher layer signaling configuration or a physical layer signaling indication that indicates the DMRS resources and the number of antenna ports at the same time, then when calculating the CSI, the UE determines the DMRS resources and the number of antenna ports in the time-domain transmission blocks according to the higher layer signaling configuration or the physical layer signaling indication received, and use them to calculate the CSI; and if the UE has not received a higher layer signaling configuration that indicates the DMRS resources and the number of antenna ports at the same time, and has not received a physical layer signaling indication that indicates the DMRS resources and the number of antenna ports at the same time, then the UE determines the DMRS resources and the number of antenna ports in the time-domain transmission blocks at the same time according to the processing in the Method 1, Method 2, or Method 3 when calculating the CSI, and uses them to calculate the CSI.

After the pattern and the number of antenna ports of the DMRS resources are determined for calculating the CSI, the UE multiplies the two values to obtain the number M2 of resources occupied by the DMRS when calculating the CSI, and then determines the number X of resources used for transmitting the PDSCH when calculating the CSI according to the number M2 of resources and the total number of resources occupied by the time-domain transmission blocks where the PDSCH is located and the number M1 of resources occupied by the DCI. The number M1 of resources occupied by the DCI and the number M2 of resources occupied by the DMRS may be excluded from the total number M of the resources of the time-domain transmission blocks where the PDSCH is located, and the number of resources occupied by the CRS may be excluded or not, to obtain the number X of resources used to transmit the PDSCH. In addition, for the resources occupied by CSI-RS, they may be excluded or not. At last, the total number M of resources occupied by the time-domain transmission blocks where the PDSCH is located and the number X of resources used to transmit the PDSCH are used to calculate the CSI, and the CSI is reported.

Method 7

For the number of ports for transmitting the DMRS in the time-domain transmission blocks, if the UE is configured for RI reporting, the DMRS overhead is consistent with the most recent reported rank, that is the number of ports for transmitting the DMRS equals RI, and if UE is not configured for RI reporting, the number of ports for transmitting the DMRS is a preset value, for example, the number of ports for transmitting the DMRS equals 1.

Embodiment 4

First, it is to be specified that when a UE is configured with serving cells that have the same length of slots, in a same slot, if there is non-periodic CSI to report, then periodic CSI will not be reported, because the non-periodic CSI is more accurate than the periodic CSI. The non-periodic CSI mentioned herein is a CSI report driven by DCI in a PDCCH, and the non-periodic CSI is reported in a PUSCH.

Hereinafter, a method for reporting periodic CSI and non-periodic CSI in a circumstance where a UE is configured with multiple serving cells in which at least two serving cells have different lengths of slots will be described.

In a case where a PUCCH is transmitted in a serving cell that has a long slot, and a PUSCH is transmitted in a serving cell that has a short slot, when the UE starts the PUCCH transmission in the serving cell that has the long slot, what is to be transmitted in the long PUCCH transmission may be periodic CSI, and the UE does not know whether there is a PUSCH transmission in the serving cell that has a short slot, and thus does not know whether there is non-periodic CSI to report, and during the PUCCH transmission, the UE knows that there is a PUSCH transmission within an overlapped period of time of the serving cell that has the short slot and the PUCCH, and the non-periodic CSI report is driven for the PUSCH, as shown in FIG. 10. In this case, there are the following several methods for determining periodic CSI and nonperiodic CSI transmission.

Method 1

In a same period of time, periodic CSI needs to be transmitted in a PUCCH in a long slot, and a PUSCH needs to be transmitted in a short slot, and DCI that schedules the PUSCH drives the non-periodic CSI report. In this case, the UE may transmit the periodic CSI in the PUCCH in the long slot and transmit the non-periodic CSI in the PUSCH in the short slot at the same time, the PUCCH where the periodic CSI is transmitted and the PUSCH where the non-periodic CSI is transmitted have an overlapped part, and the non-periodic CSI includes non-periodic CSI of all cells driven. For example, if in the PUCCH, periodic CSI of a serving cell 1 is transmitted, and the non-periodic CSI driven includes non-periodic CSI of the serving cell 1, nonperiodic CSI of a serving cell 2 and non-periodic CSI of a serving cell 3, then the UE transmits the non-periodic CSI of the serving cell 1, the non-periodic CSI of the serving cell 2 and the non-periodic CSI of the serving cell 3 in the PUSCH. Or the UE may transmit the periodic CSI in the PUCCH in the long slot and transmit the nonperiodic CSI in the PUSCH in the short slot at the same time, and the PUCCH where the periodic CSI is transmitted and the PUSCH where the non-periodic CSI is transmitted have an overlapped part, and only non-periodic CSI of a serving cell that has not reported periodic CSI in the PUCCH in the non-periodic CSI of all the cells driven is reported. For example, in the PUCCH, the periodic CSI of the serving cell 1 is transmitted, and the non-periodic CSI driven includes the non-periodic CSI of the serving cell 1, the non-periodic CSI of the serving cell 2 and the non-periodic CSI of the serving cell 3, then the UE transmits the non-periodic CSI of the serving cell 2 and the non-periodic CSI of the serving cell 3 in the PUSCH, and does not report the nonperiodic CSI of the serving cell 1, because the periodic CSI of the serving cell 1 has been transmitted in the PUCCH.

Method 2:

In a same period of time, a PUCCH needs to be transmitted in a long slot, and a PUSCH needs to be transmitted in a short slot, and if in the short slot, a PDCCH that schedules the PUSCH transmission is transmitted t milliseconds before the transmission of the long PUCCH, that is, before transmitting periodic CSI in the long PUCCH, the UE has known that the UE is gong to transmit the PUSCH in a serving cell that has the short slot and report non-periodic CSI in the PUSCH, and in this case, the UE may not transmit the periodic CSI in the PUCCH, but report the non-periodic CSI in the PUSCH, as shown in FIG. 11. If in the short slot, the PDCCH that schedules the PUSCH transmission is transmitted after t milliseconds before the transmission of the long PUCCH, that is, before transmitting periodic CSI in the long PUCCH, the UE does not known that the UE is gong to transmit the PUSCH in the serving cell that has the short slot and report non-periodic CSI in the PUSCH, and in this case, the UE may transmit the periodic CSI in the PUCCH in the long slot and transmit the non-periodic CSI in the PUSCH in the short slot at the same time, and the PUCCH where the periodic CSI is transmitted and the PUSCH where the non-periodic CSI is transmitted have an overlapped part, and the non-periodic CSI includes non-periodic CSI of all the cells driven. For example, if what is transmitted in the PUCCH is the periodic CSI of the serving cell 1, and the non-periodic CSI driven includes the non-periodic CSI of the serving cell 1, the non-periodic CSI of the serving cell 2 and the non-periodic CSI of the serving cell 3, then the UE transmits the non-periodic CSI of the serving cell 1, the non-periodic CSI of the serving cell 2 and the non-periodic CSI of the serving cell 3, as shown in FIG. 12. Or in this case, the UE may transmit the periodic CSI in the PUCCH in the long slot and transmit the non-periodic CSI in the PUSCH in the short slot at the same time, and the PUCCH where the periodic CSI is transmitted and the PUSCH where the non-periodic CSI is transmitted have an overlapped part, and only the non-periodic CSI of a serving cell that has not reported periodic CSI in the PUCCH in all non-periodic CSI of all the cells driven. For example, if in the PUCCH, what is transmitted is the periodic CSI of the serving cell 1, and the non-periodic CSI driven includes the non-periodic CSI of the serving cell 1, the non-periodic CSI of the serving cell 2 and the non-periodic CSI of the serving cell 3, then the UE transmits the nonperiodic CSI of the serving cell 2 and the non-periodic CSI of the serving cell 3, and does not report the non-periodic CSI of the serving cell 1, as shown in FIG. 13. The value of t may be configured by higher layer signaling or may be preset by a protocol, and for example, t is equal to 20 microseconds.

The foregoing is the detailed implementation of the method for reporting CSI according to the present disclosure. The present disclosure further provides an apparatus for reporting CSI, and the apparatus may be used to implement the foregoing method for reporting CSI. FIG. 14 is a schematic diagram of a basic structure of the apparatus for reporting CSI. As shown in FIG. 14, the apparatus includes a resource number determination unit and a CSI calculating and reporting unit.

The resource number determination unit is to determine the number of resources occupied by DMRS used when calculating CSI, and determine the number of resources used to transmit a PDSCH used when calculating the CSI according to the number of resources occupied by the DMRS. The CSI calculating and reporting unit is to calculate the CSI according to the determined number of resources used to transmit the PDSCH, and report the CSI.

Using the method and apparatus for reporting CSI according to the present disclosure can accurately determine the resources for transmitting a PDSCH when calculating CSI, so as to guarantee the performance of transmitting the PDSCH.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for operating a user equipment (UE) in a wireless communication system, the method comprising:
    identifying a number of resources for a channel state information (CSI) determination based on a configuration by a higher layer signaling, in response to an indication to perform a CSI report in downlink control information (DCI);
    determining CSI comprising a channel quality indicator (CQI) based on the number of the resources; and
    transmitting, to a base station, the CSI,
    wherein a number of symbols of the resources is less than 14 according to the configuration.

2. The method of claim 1, wherein the number of the resources is half of a number of the resources for a CSI determination in another configuration.

3. The method of claim 1, further comprising:
    determining a number of demodulation reference signal (DMRS) resources for the CSI determination; and
    determining a number of physical downlink shared channel (PDSCH) resources for the CSI determination based on the number of DMRS resources.

4. The method of claim 3, further comprising:
    determining a number of symbols occupied by downlink control information (DCI) for the CSI determination,
    wherein the determining the number of PDSCH resources comprises determining the number of PDSCH resources based on the number of the resources for the CSI determination and the number of symbols occupied by the DCI.

5. The method of claim 4, wherein the determining the number of symbols occupied by the DCI for the CSI determination comprises determining the number of symbols occupied by the DCI for the CSI determination based on at least one of:
    a preset;
    at least one of a characteristic of a synchronization signal received, information carried in the synchronization signal, customized information received, or a customized signal received;
    indication information in system information;
    a higher layer signaling or a physical layer signaling received; or
    a mapping relationship.

6. The method of claim 5, wherein the determining the number of symbols occupied by the DCI comprises determining the number of symbols occupied by the DCI based on at least one of:
    an indication to perform a CSI report in the physical layer signaling; or
    an indication to perform the CSI report in the DCI.

7. The method of claim 4, wherein the number of PDSCH resources for the CSI determination excludes:
    the number of symbols occupied by the DCI and the number of DMRS resources from the number of the resources for the CSI determination without excluding a number of the resources occupied by a cell-specific reference signal (CSR); or
    the number of symbols occupied by the DCI, the number of DMRS resource and the number of the resources occupied by the CRS.

8. The method of claim 3, wherein the determining the number of DMRS resources comprises:
   determining at least one of pattern or a number of antenna ports of the DMRS resources; and
   determining the number of DMRS resources based on at least one of the pattern or the number of antenna ports of the DMRS resources.

9. The method of claim 8, wherein the determining at least one of the pattern or the number of antenna ports of the DMRS resources comprises determining at least one of the pattern or the number of antenna ports of the DMRS resources based on at least one of:
   a preset;
   at least one of a subcarrier spacing, a cyclic prefix (CP) length, a CP overhead of a symbol, the number of the resources for the CSI determination, or a carrier frequency;
   indication information in system information; or
   a higher layer signaling or a physical layer signaling.

10. A user equipment (UE) in a wireless communication system comprising:
    at least one processor configured to:
       identify a number of resources for a channel state information (CSI) determination based on a configuration by a higher layer signaling, in response to an indication to perform a CSI report in downlink control information (DCI), and
       determine CSI comprising a channel quality indicator (CQI) based on the number of the resources; and
    a transceiver configured to transmit, to a base station, the CSI,
    wherein a number of symbols of the resource is less than 14 according to the configuration.

11. The UE of claim 10, wherein the number of the resources is half of a number of the resources for a CSI determination in another configuration.

12. The UE of claim 10, wherein the at least one processor is further configured to:
    determine a number of demodulation reference signal (DMRS) resources for the CSI determination, and
    determine a number of physical downlink shared channel (PDSCH) resources for the CSI determination based on the number of DMRS resources.

13. The UE of claim 12,
    wherein the at least one processor is further configured to determine a number of symbols occupied by downlink control information (DCI) for the CSI determination, and
    wherein the determining the number of PDSCH resources comprises determining the number of PDSCH resources based on the number of the resources for the CSI determination and the number of symbols occupied by the DCI.

14. The UE of claim 13, wherein the at least one processor is further configured to determine the number of symbols occupied by the DCI for the CSI determination based on at least one of:
    a preset;
    at least one of a characteristic of a synchronization signal received, information carried in the synchronization signal, customized information received, or a customized signal received;
    indication information in system information;
    a higher layer signaling or a physical layer signaling received; or
    a mapping relationship.

15. The UE of claim 14, wherein the at least one processor is further configured to determine the number of symbols occupied by the DCI based on at least one of:
    an indication to perform a CSI report in the physical layer signaling; or
    an indication to perform the CSI report in the DCI.

16. The method of claim 13, wherein the number of PDSCH resources for the CSI determination excludes:
    the number of symbols occupied by the DCI and the number of DMRS resources from the number of the resources for the CSI determination without excluding a number of the resources occupied by a cell-specific reference signal (CSR); or
    the number of symbols occupied by the DCI, the number of DMRS resource and the number of the resources occupied by the CRS.

17. The UE of claim 12, wherein the at least one processor is further configured to:
    determine at least one of pattern or a number of antenna ports of the DMRS resources, and
    determine the number of DMRS resources based on at least one of the pattern or the number of antenna ports of the DMRS resources.

18. The UE of claim 17, wherein the at least one processor is further configured to determine at least one of the pattern or the number of antenna ports of the DMRS resources based on at least one of:
    a preset;
    at least one of a subcarrier spacing, a cyclic prefix (CP) length, a CP overhead of a symbol, the number of the resources for the CSI determination, or a carrier frequency;
    indication information in system information; or
    a higher layer signaling or a physical layer signaling.

* * * * *